Jan. 6, 1953 M. A. HOVERS 2,624,446
CONVEYER BELT PROVIDED WITH ELEVATOR SCOOPS
Filed Dec. 23, 1950 2 SHEETS—SHEET 2
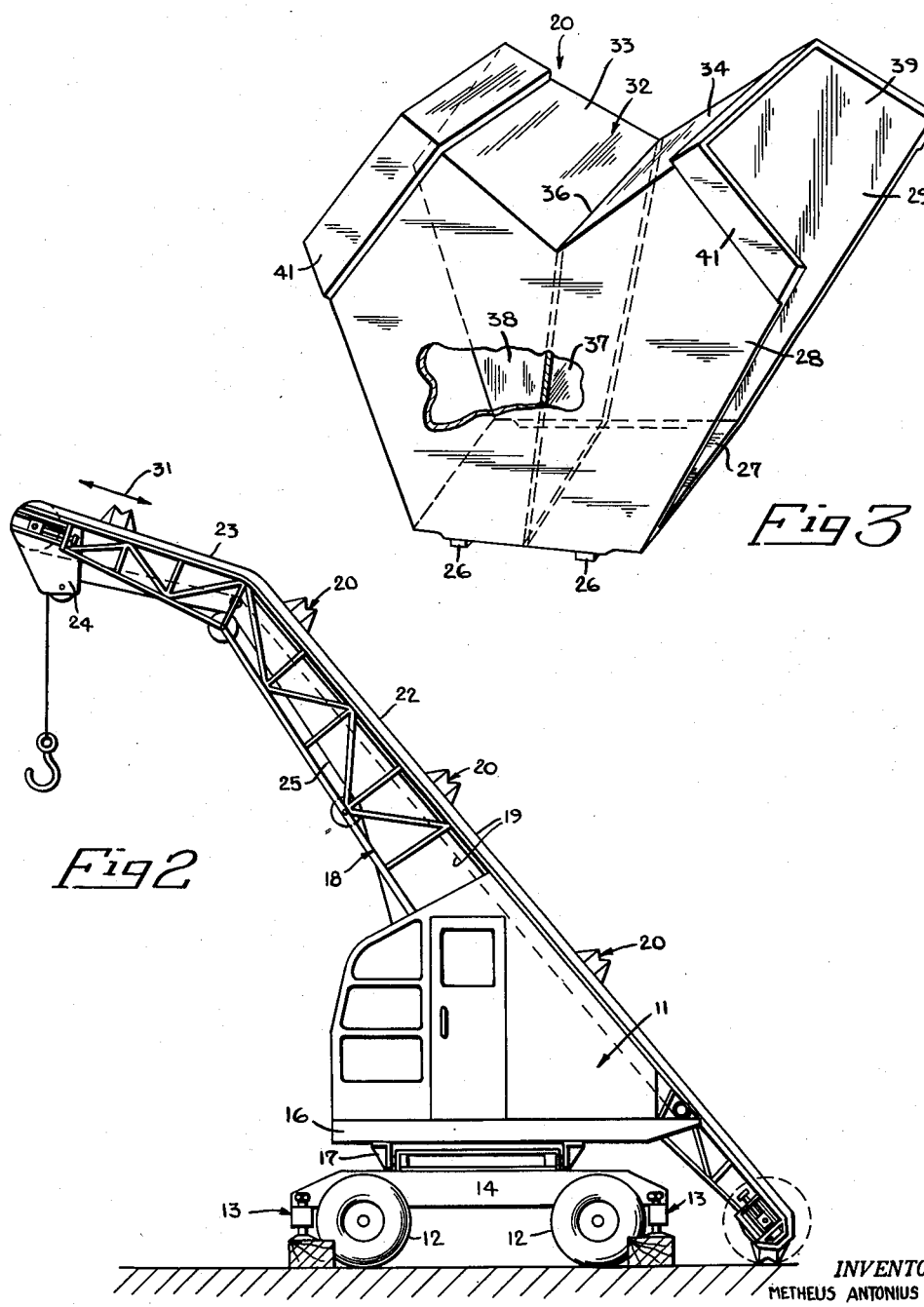
INVENTOR:
METHEUS ANTONIUS HOVERS,
BY
HIS AGENT.

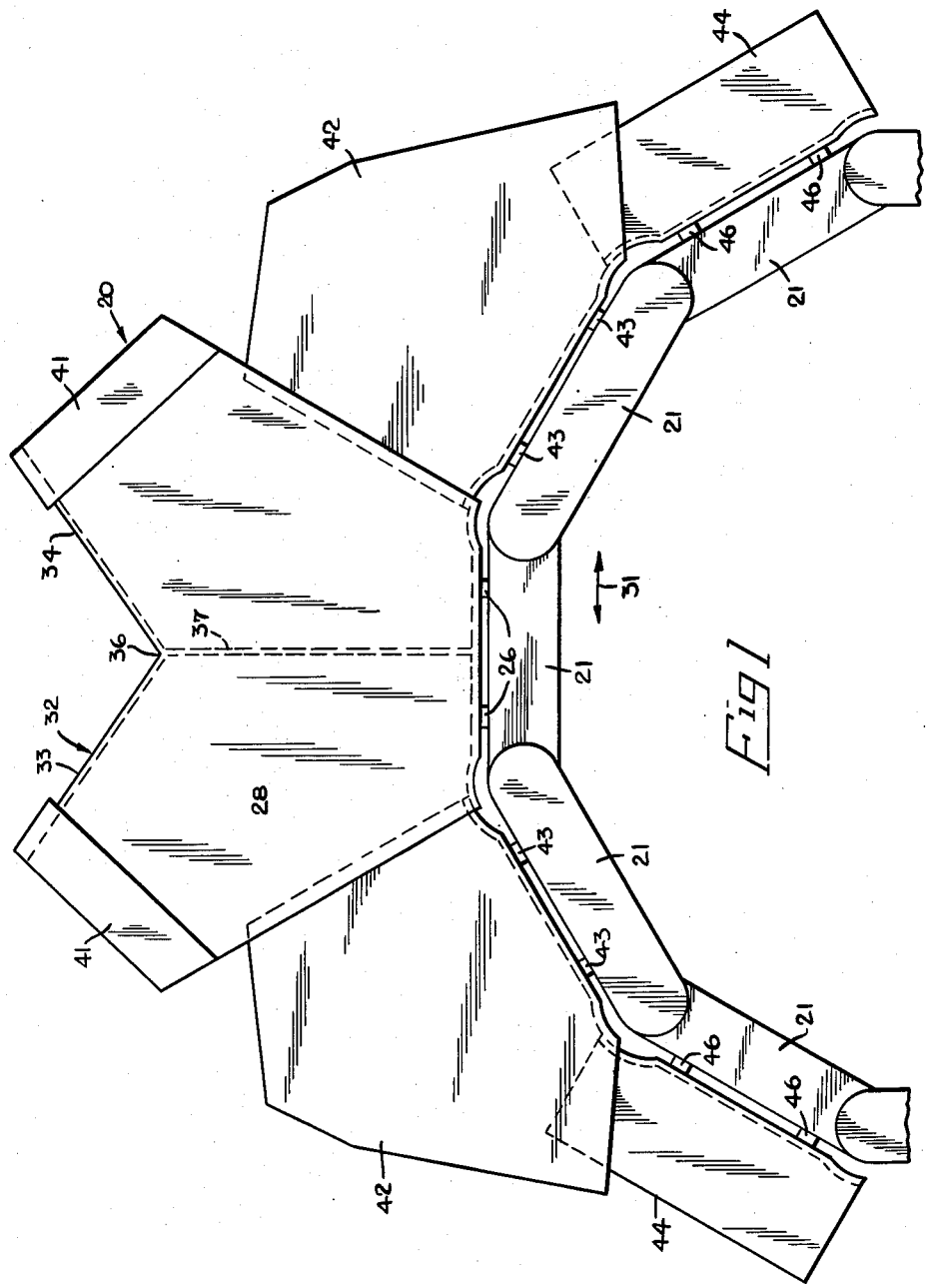

Patented Jan. 6, 1953

2,624,446

UNITED STATES PATENT OFFICE 2,624,446

CONVEYER BELT PROVIDED WITH ELEVATOR SCOOPS

Metheus Antonius Hovers, Tilburg, Netherlands

Application December 23, 1950, Serial No. 202,548
In the Netherlands September 8, 1949

3 Claims. (Cl. 198—152)

The invention relates to a conveyor system, and relates more particularly to a conveyor system of the type having an endless belt or chain suspended on a carrier and being provided with scoop members connected to links of the chain.

Systems of this type are known, but they have the disadvantage that the scoops operate only in one direction of chain movement. Consequently, if bailing in the opposite direction is required, it is first necessary to turn around the entire carrier so that the scoops will be turned about along with the carriage, to operate in the new direction.

The instant invention accordingly has among its objects the provision of a conveyor system that is operable in opposite directions simply by reversing the direction of chain movement.

The foregoing and other objects of the invention will be best understood from the following description of exemplifications thereof, reference being had to the accompanying drawings, wherein:

Fig. 1 is a fragmentary elevational view of a portion of the conveyor system in accordance with the invention;

Fig. 2 is a small-scale elevational view of the system; and

Fig. 3 is a perspective view, partly in section, of the scoop shown in Figs. 1 and 2.

In carrying the invention into effect in one of the embodiments which has been selected for illustration in the accompanying drawings and for description in this specification, and referring now particularly to Fig. 2, there is provided a carrier generally indicated at 11 that is mounted on a structure 14 having wheels 12 for carrier transportation, and is shown blocked up for use of the system, by means of a blocking arrangement indicated at 13.

An operating support 16 surmounts the structure 14 and is rotatable relative thereto by means of a revolving wheel and track mechanism 17. The support 16 carries a frame 18 for an endless chain 19, and scoop members such as scoops, generally indicated at 20, are mounted at spaced intervals on links 21 of the chain 19. The chain 19 is movable in opposite directions 31. The frame 18 has a long portion 22 that may be moved on the support 16 to various positions of inclination by means of an apparatus such as a power mechanism 25, and has a short portion 23 that may be inclined at a different angle than the long portion 22. A hoist 24 is mounted on the free end of the short portion 23 of the frame 18.

As best shown in Fig. 1, each of the scoops 20 is mounted on a link 21 by means of connecting members 26. Each scoop 20 has a bottom portion 27, and oppositely disposed sidewalls 28 and 29 that are mounted on the bottom portion parallel of the directions 31 of opposite movement of the chain 19. Each scoop 20 furthermore has a top section 32 that is connected to the sidewalls 28 and 29 and is composed of two oppositely inclined parts 33 and 34 which intersect about midway of the scoop along a lowermost edge 36. A partition wall 37 divides the interior of the scoop into two chambers 38 and 39, and the partition wall 37 is secured on the interior of the scoop to the sidewalls 28 and 29, to the top 32 at the edge 36 thereof, and to the bottom 27 about midway of its length. The outermost rim on each chamber of the sidewalls 28 and 29 and the top 32 may be provided with a reinforcement 41.

In either direction of chain movement, one of the chambers 38 and 39 will act for scooping, the part of the top portion 32 assigned to the active chamber operating as a bail in the direction of chain movement.

Each of the links 21 adjoining the scoop carrying link is provided with a pair of wall sections 42 that are spaced from each other across the width of the link for a distance corresponding to the interior width of the chamber 38 or 39. Each wall section 42 is connected to its link 21 by means of supports 43 and extends to the interior of the chamber adjacent thereto but is not connected thereto but is in overlapping relation with one of the sidewalls 28 or 29. Each wall section 42 partakes in the angular movement of its link relative to that which carries the scoop 20, as the chain is bent, for instance when the links reach the end rollers of the frame 18.

The links 21 adjacent to the links carrying the sections 42, are carrying smaller sections 44. Two opposite sections 44 are connected to a link 21 by means of connecting members 46 and are spaced from each other across the width of the link for a distance corresponding to the interior width between the sections 42. The sections 44 extend to the interior formed between the sections 42 and are with its link angularly movable relative to the link that carries the sections 42. The series of sections 42 and 44 adjacent each of the sidewalls 28 or 29 are off-set against the said sidewall and also relative to each other, so that the sections 44 overlap for a portion the inside of the sections 42, and the sections 42 overlap for a portion the sidewalls 28 and 29.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent is as follows:

1. In a conveyor system having an endless oppositely movable chain composed of interengaged links and scoop members connected to some of said links for transportation thereby, in combination, each scoop member comprising a housing structure including opposite sidewall portions disposed parallel of the direction of chain movement, a bottom portion connected to said chain and interconnected to said sidewall portions, a top portion interconnected to said sidewall portions and including two oppositely inclined parts intersecting about midway between said sidewall portions at a lowermost edge, and a solid partition portion extending about midway of said sidewall portions and transversely of said direction of movement and interconnecting said lowermost edge of said top portion and said sidewall portions and the central region of said bottom portion, said partition dividing the interior of said scoop into two opposite chambers open on opposite sides, whereby said scoop may perform loading with either chamber, the inclined top part of a chamber operating as a bail.

2. In a conveyor system, as claimed in claim 1, together with two oppositely disposed wall sections connected to links adjacent each scoop member on either side thereof and extending to the interior of each scoop chamber, said wall sections being spaced from each other across the chain width for a distance corresponding to the interior width of said chamber and being free from direct connection with the scoop member and movable relative thereto with the angular movement of the chain links thereof relative to that of said scoop member.

3. In a conveyor system, as claimed in claim 1, together with paired series of off-set wall sections, one series of sections disposed on the side of each sidewall of said scoop member, each wall section being connected to a link and extending in overlapping movable relation over the adjoining section, the section nearest to a chamber extending thereinto overlapping a sidewall portion thereof and movable relative thereto.

METHEUS ANTONIUS HOVERS.

REFERENCES CITED

The following references are of record in the file of this patent:

FOREIGN PATENTS

| Number | Country | Date |
| --- | --- | --- |
| 2,861 | Great Britain | Feb. 25, 1888 |
| 4,188 | Great Britain | Feb. 20, 1906 |
| 502,643 | Germany | July 16, 1930 |